June 4, 1940.   O. G. BAUMAN   2,203,008
TOOL AND TACKLE BOX
Filed Oct. 13, 1938   2 Sheets-Sheet 1
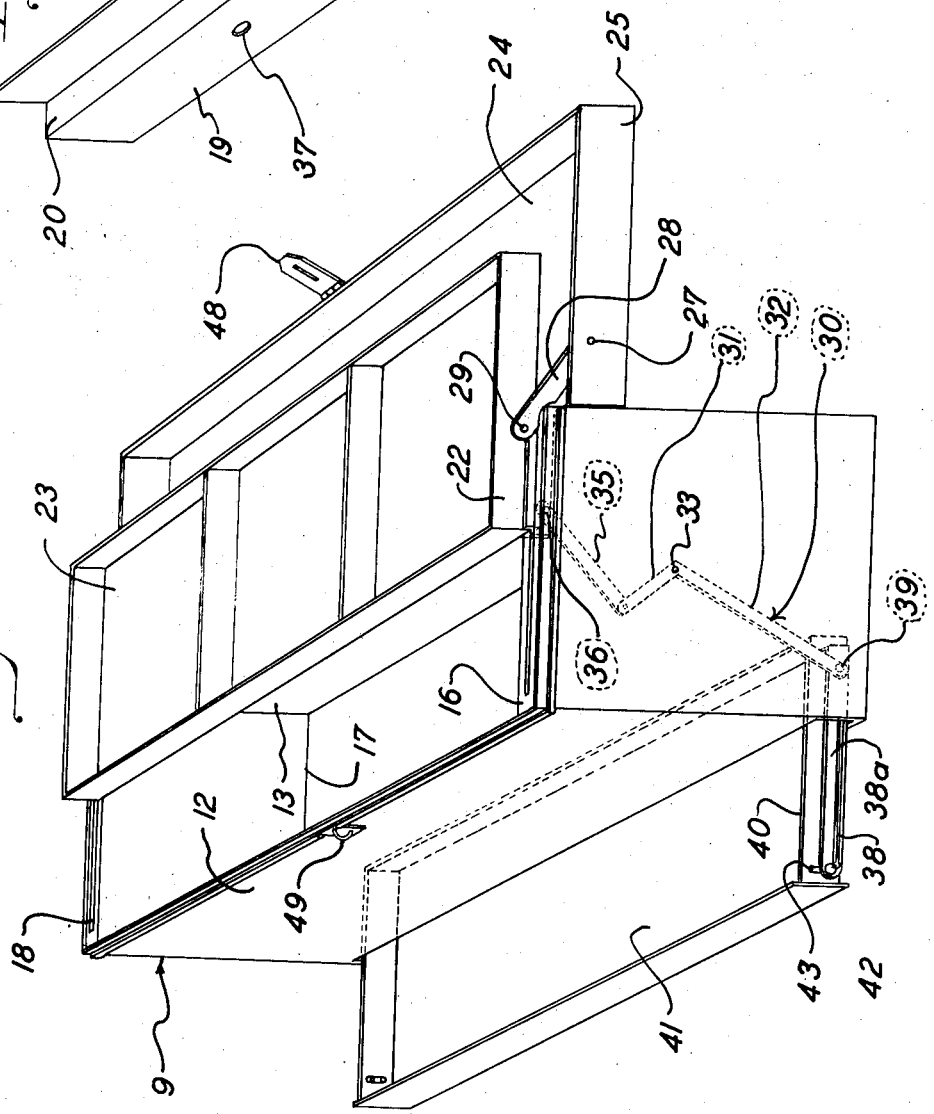

June 4, 1940.    O. G. BAUMAN    2,203,008
TOOL AND TACKLE BOX
Filed Oct. 13, 1938    2 Sheets-Sheet 2

INVENTOR
Oscar G. Bauman
BY Adam E. Fisher
ATTORNEY

Patented June 4, 1940

2,203,008

UNITED STATES PATENT OFFICE 2,203,008

TOOL AND TACKLE BOX

Oscar G. Bauman, St. Louis, Mo.

Application October 13, 1938, Serial No. 234,750

3 Claims. (Cl. 206—16)

This invention presents new and useful improvements in tool and tackle boxes such as are used by workmen and sportsmen and has for its principal object to provide a tool and tackle box having a tray and drawer connected by suitable levers so that upon opening the lid or cover both the tray and drawer are moved to the open position, the drawer being constructed in such a manner that it may be returned to the closed position and opened again independently of the tray.

Another object of this invention is to provide a tool or tackle box of suitable shape and size having a lid or cover hinged to the rear wall thereof, said lid having at either end a connecting link pivotally secured thereto, the other end of said links being secured to a tray slidably positioned by means of runners and guides upon the top of the box in such a manner that the tray is drawn backward upon opening the lid thereby exposing the tool compartment beneath the tray. Angularly constructed levers medially pivoted to the end walls of the box are connected at their upper ends to the tray runners by means of links, the said levers being pivotally pinned at their lower ends to guide members upon the ends of the drawer in such a manner that the drawer is forced outwardly from the front of the box upon opening the lid or cover, and is drawn back into the box as the lid is closed.

With the foregoing and other objects in view reference will be had to the accompanying drawings forming a part of this specification, wherein:

Figure 1 is a perspective view of a tool box constructed in conformity with this specification, the box being shown in the open position and the angularly constructed operating lever and related equipment being shown by dotted lines;

Figure 2 is an enlarged perspective view of the tray runner;

Figure 3:
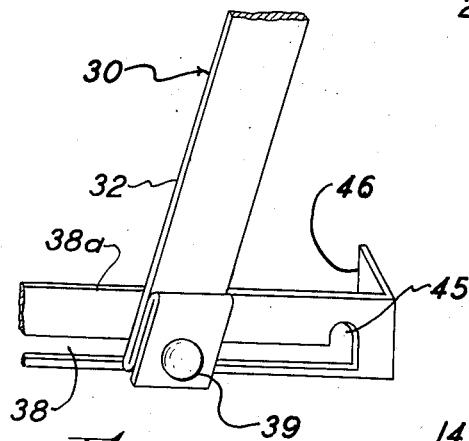
Figure 3 is an enlarged fragmentary view of the slotted drawer guide having a portion of the angularly constructed operating lever pivotally secured thereto.
Figure 4:
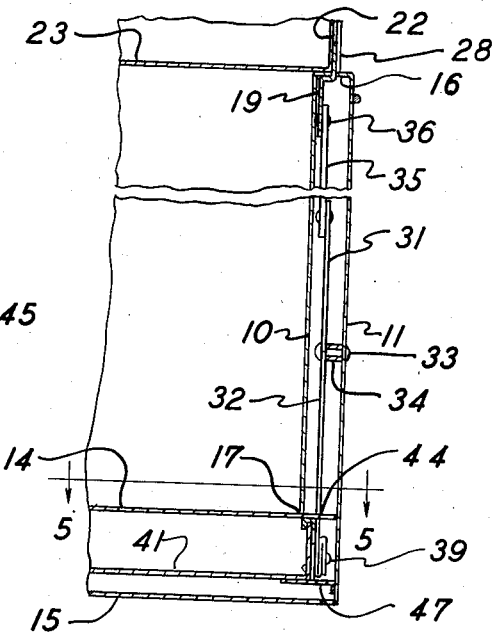
Figure 4 is an enlarged partial longitudinal section through the box showing the operative elements therein.
Figure 5:
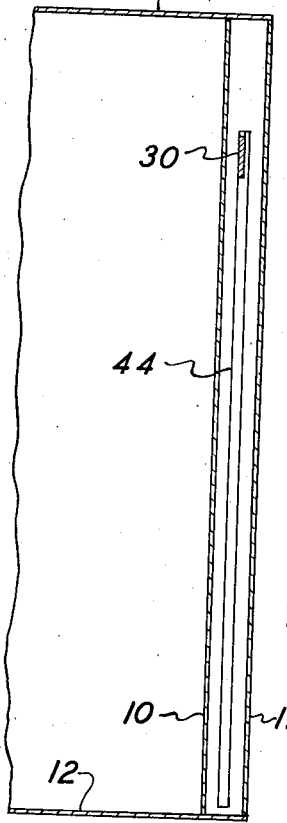
Figure 5 is a sectional view on the line 5—5 of Figure 4.
Figure 6:
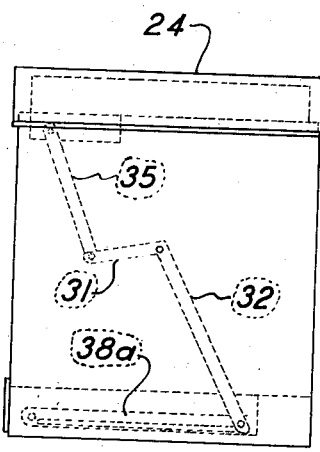
Figure 6 is an end view of the box shown in the closed position, the operating elements being shown by dotted lines.

Referring now more particularly to the drawings forming a part of this specification it will be seen that the reference numeral 9 generally denotes the housing of this tool or tackle box said housing consisting of the double ends made up each of the outer and inner walls 10—11, the single front and rear walls 12—13, and the double bottom made up of the upper and lower plates 14—15 all secured to one another, as by welding, to form a box like structure preferably of the shape as exemplified in the accompanying drawings. As shown in Figure 4 the inner end walls have their upper margins 16 bent outwardly at right angles thereto and welded to the outer end walls 11, the lower margins 17 of the inner side walls terminating at the upper base plate 14 and secured thereto by welding or the like, thereby forming an enclosed space between the end walls. A tray 23 is provided and slidably mounted on the top of the box by means of angular runners 19 depended from the ends of the tray down into guide slots 18 formed in the angularly turned upper margins 16 of the inner end walls for the reception of the said runners said runners being perpendicularly offset at 20 to prevent the removal of the runners from the guide slots 18. A lid or cover 24 having the inwardly turned margins 25 is mounted upon the upper part of the rear wall by means of a hinge or hinge joint 26, said lid having pivotally secured thereto at either end, by means of rivets or pins 27, links 28, said links having their opposite ends similarly pivotally fastened to the side margins 22 of the tray by means of rivets or pins 29 the use of which links will be explained later. Angular or bell-crank levers 30 having the angularly extended arms 31—32 are pivotally mounted, within the side walls 10—11, upon the inner side of the outer side walls 11, by rivets or pins 33, there being spacers 34 upon the pins between the levers and side walls to insure the proper clearance therebetween. The outer extremities of the upper arms 31 of the levers are pivotally connected by links 35 to the runners 19 by means of pins 36 through the apertures 37. The lower arms 32, passing through guide slots 44 in the upper base plate 14, have their extremities pivotally seated within the slots 38 of the longitudinally slotted guide members 38a by pins 39, the aforementioned slotted guide members being loosely secured to the ends 40 of a drawer 41 by means of pins 42, said drawer being slidably mounted within the lower portion of the box between the upper and lower base plates 14 and 15, the aforementioned pins being positioned in vertical slots 43 in the ends of the drawer. The above longitudinally slotted guide members have upwardly extended niches 45 near their inner extremities 46 for the reception of the pins 39, whereby the arms 32 are locked in position therein against horizontal movement, this being the normal position of these elements. The inner extremities 46 of these slotted guide members are offset inwardly thereby preventing their passing through the guide slots 44 in the upper base plate 14.

In use, assuming the tool box to be in the closed position, the lid or cover 24 is raised causing the connecting links 28 to pull the tray 23 backwards, the tray moving only in a horizontal plane, any other movement being prevented by the integrally constructed runners and brackets 19—21, operating in the slots 18, to which the tray is secured. Simultaneously with the backward movement of the tray the levers 30 are moved about their fulcrums 33 by the links 35 connected to the upper arms 31 and runners 19, the upper arms moving upward and backward and the lower arms 32 moving forward. As the lower arms 32 of the levers 30 are normally releasably locked in the niches 45 of the slots 38 of the members 38a, said members being secured to the ends of the drawer, the forward movement of the arms 32 causes the drawer to be expelled forwardly from the box, drawer slides 47 fastened to the outer end walls of the box being provided for the drawer to slide upon.

The drawer may be closed independently of the tray or lid by raising the slotted guide members 38a in the slots 43, thereby releasing the pins 39 from the niches 45. In closing the box the movement of the aforementioned elements is naturally reversed.

In the closed position the drawer is held within the box by the lever 30 thereby eliminating any necessity of an exterior lock on the drawer, the conventional hasp 48 and staple 49 serving to hold the box in the locked position.

Figure 7:
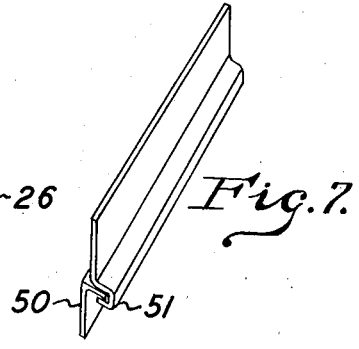
Figure 7 is an enlarged perspective view of a modified form of tray runner and guide applicable to a box having no drawer.
Figure 8:
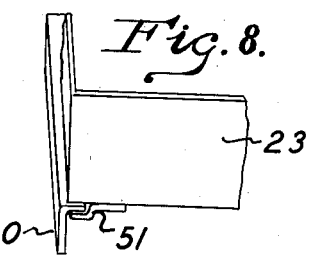
Figure 8 is an enlarged view of another modified form of tray runner and guide, the tray being partially shown thereon, as in Figure 7 this form is applicable to boxes having a tray only.

Figures 7 and 8 show a modified form of tray guide and runner for use on boxes having no drawer at the bottom thereof. In Figures 7 and 8 the guides are designated by the numerals 50 and the combination runners and brackets by the numeral 51.

Having herein set forth a preferred embodiment of this invention it is to be clearly understood that minor changes in the construction, combination and arrangement of the several parts of the invention may be resorted to as modern expediency may dictate, not departing, however from the spirit of the invention as claimed.

What is claimed is:

1. A box assembly embodying a rectangular casing open at top and having double ends and a double bottom enclosing a space opening forwardly, a drawer slidably mounted in the space of the double bottom and arranged to move horizontally outwardly and inwardly, a tray slidably anchored atop the box and arranged to move forwardly over the box to close the open top thereof, and to move horizontally rearward to open same, a dished cover hinged at one margin to the rear upper margin of the box and adapted to close over the top of the box and the tray and to open rearwardly to a horizontal position, and lever elements pivotally connecting the cover, tray and drawer to operate all in unison, projecting the drawer and retracting the tray as the cover is opened to its horizontal position, said action being reversed as the cover is closed, the said operating elements including links pivotally connected at their ends to the ends of the lid and tray, bell-crank levers pivoted through their fulcrums, within the double ends of the casing, and upper and lower links pivotally connected at one end to the ends of the bell-cranks, and at the other end to the ends of the upper tray and lower drawer respectively.

2. In a device of the kind described, a rectangular housing having spaced inner and outer end walls, single front and rear walls, and a frontally open double bottom including spaced upper and lower walls and single end walls, the top of the housing being open, a tray slidably anchored over the open top of the housing to move horizontally back to uncover the interior thereof, a cover to fit upon the top of the housing and having margins turned perpendicularly to one side, to enclose the tray atop the housing, the cover being hinged by one margin to an upper margin of the housing in such manner as to open out horizontally therefrom, link and lever connections pivotally mounted within the double ends of the housing and connecting the tray, drawer and cover so that as the cover is opened out and back horizontally the drawer will be automatically projected out forwardly through the double bottom and the tray will be drawn horizontally back from the top of the housing, and as the cover is closed the tray and drawer will retract to their closed positions, the said connections including links pivotally connected at their ends to the ends of the lid and tray, bell-crank levers pivoted through their fulcrums within the ends of the housing and upper and lower links pivotally connected at one end to the ends of the bell cranks and at the other end to the ends of the tray and drawer respectively.

3. In a structure according to claim 2, releasable connections between the ends of the drawer and the lower ends of the link and lever units within the double ends of the housing above the drawer, whereby the drawer may be freed from control by these elements and operated independently thereof when the cover is in open position.

OSCAR G. BAUMAN.